United States Patent
Stapleton et al.

(10) Patent No.: US 6,574,577 B2
(45) Date of Patent: Jun. 3, 2003

(54) CIRCUIT TO INDICATE THE STATUS OF A SUPPLY VOLTAGE

(75) Inventors: Michael A. Stapleton, Portland, OR (US); Bernard W. Boland, Hillsboro, OR (US); Jeffery J. Olsen, Banks, OR (US); John A. Dickerson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 09/735,812

(22) Filed: Dec. 13, 2000

(65) Prior Publication Data

US 2002/0072871 A1 Jun. 13, 2002

(51) Int. Cl.$^7$ .............................. H02H 7/00; G06F 15/00
(52) U.S. Cl. ......................................... 702/117; 713/340
(58) Field of Search .................... 713/300, 310, 713/330, 340; 327/143, 198, 142; 702/117

(56) References Cited

U.S. PATENT DOCUMENTS

| | | | | |
|---|---|---|---|---|
| 5,757,171 A | * | 5/1998 | Babcock | 323/271 |
| 5,834,958 A | * | 11/1998 | Taylor et al. | 327/143 |
| 5,912,571 A | * | 6/1999 | Li et al. | 327/143 |
| 6,137,188 A | * | 10/2000 | Mitchell et al. | 307/29 |
| 6,256,180 B1 | * | 7/2001 | Voit | 361/18 |
| 6,259,285 B1 | * | 7/2001 | Woods | 327/143 |
| 6,275,364 B1 | * | 8/2001 | Voit | 361/18 |
| 6,327,663 B2 | * | 12/2001 | Isaac et al. | 713/300 |
| 6,396,169 B1 | * | 5/2002 | Voegeli et al. | 307/52 |
| 6,442,746 B1 | * | 8/2002 | James et al. | 716/14 |
| 6,448,672 B1 | * | 9/2002 | Voegeli et al. | 307/52 |
| 2002/0073346 A1 | * | 6/2002 | Yu et al. | 713/300 |
| 2002/0109489 A1 | * | 8/2002 | Shaver et al. | 323/283 |

OTHER PUBLICATIONS

Intel VRM 8.3 DC–DC Converter Design Guidelines cited by Voit ('180 B1) above with filing date Feb. 26, 1999.*

* cited by examiner

Primary Examiner—Patrick Assouad
(74) Attorney, Agent, or Firm—Trop, Pruner & Hu, P.C.

(57) ABSTRACT

A system includes a processor, a voltage regulator and a circuit. The processor uses a first supply voltage to furnish a first indication of a second supply voltage to be received by the processor. The voltage regulator furnishes the second supply voltage in response to both the first indication and a second indication that the first supply voltage is valid. The circuit provides the second indication and regulates a timing of the second indication to prevent the voltage regulator from furnishing the second supply voltage until a predefined interval of time has elapsed after the first supply voltage becomes valid.

22 Claims, 3 Drawing Sheets

CIRCUIT TO INDICATE THE STATUS OF A SUPPLY VOLTAGE

BACKGROUND

The invention generally relates to a circuit to indicate the status of a supply voltage.

A typical computer system includes a power supply that provides and regulates various supply voltages that are used by the components of the computer system. As examples, the computer system may provide and regulate supply voltages for 5 volt (V), 3.3 V, 2.5 V, 1.8 V and 1.5 V supply lines, or power planes, of the computer system.

One component that receives supply voltages from the voltage planes of the system is a microprocessor. The microprocessor may be encoded with a voltage identification (VID) number, a number that identifies a specific supply voltage to be furnished to the core circuitry of the microprocessor. In this manner, at powerup of the computer system, circuitry of the microprocessor other than its core circuitry may receive a supply voltage for purposes of communicating an indication of the VID number to an external voltage regulator. This voltage regulator then generates the supply voltage for the core circuitry of the microprocessor based on the indicated VID number.

DETAILED DESCRIPTION

Figure 1:
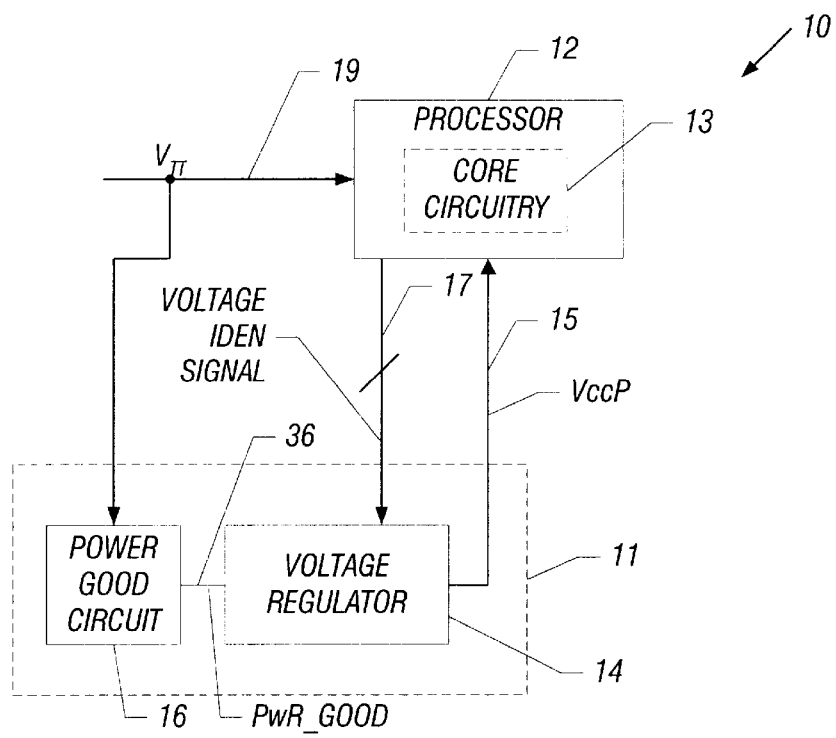
FIG. 1 is a schematic diagram of a system according to an embodiment of the invention.

Referring to FIG. 1, an embodiment 10 of a system in accordance with the invention includes a power subsystem 11 that furnishes a supply voltage (called $V_{CCP}$) for powering core circuitry 13 of a processor 12 (a microprocessor, for example) of the system 10. More specifically, the power subsystem 11 furnishes the $V_{CCP}$ voltage to a supply voltage plane 15 that is coupled to the core circuitry 13.

In some embodiments of the invention, the processor 12 is encoded with a voltage identification (VID) number to establish the appropriate level of the $V_{CCP}$ voltage. In this manner, the processor 12 may be tested after its fabrication to determine an optimal supply voltage for the specific core circuitry 13 of the processor 12. This optimal voltage level is encoded into the processor 12 in the form of the VID number that is readable from specific VID external contacts (pins or balls) of the processor 12.

During power up of the system 10, the processor 12 selectively couples the external VID contacts to another supply voltage (called $V_{TT}$) that comes up before the $V_{CCP}$ supply voltage. In this manner, the processor 12 uses the $V_{TT}$ voltage for purposes of indicating the VID number. Thus, a voltage regulator 14 of the power subsystem 11 receives the indication (via voltage identification lines 17) of the VID number from the processor 12 and in response to this indication furnishes the appropriate $V_{CCP}$ supply voltage to the supply voltage plane 15.

A potential problem with this arrangement is that during initial power up of the system 10, the processor's indication of its VID number may be invalid. Thus, it is possible that the voltage regulator 14 may furnish the wrong $V_{CCP}$ supply voltage and therefore, may damage and/or impede the performance of the processor 12. More specifically, it has been discovered that the processor 12 may incorrectly indicate its VID number before a certain amount of time has passed after the $V_{TT}$ voltage has risen to its nominal level and is deemed valid.

Therefore, unlike conventional systems, the power subsystem 11 takes measures (described below) to prevent the voltage regulator 14 from providing the $V_{CCP}$ supply voltage until a predefined time interval has elapsed from the time when the $V_{TT}$ voltage becomes valid. Thus, such an arrangement ensures that the processor 12 indicates an accurate VID number before the voltage regulator 14 supplies the $V_{CCP}$ supply voltage that is indicated by the VID number.

The advantages of the above-described arrangement may include one or more of the following. The correct supply voltage is furnished to the core circuitry of the processor. The circuit to establish the predefined delay may have a simple design, have a relatively low cost and be relatively easy to construct. Existing power supply systems may be modified to accommodate the features of the power subsystem. Other and/or different advantages may be possible.

In some embodiments of the invention, the power subsystem 11 includes a power good circuit 16 to indicate the status of the $V_{TT}$ supply voltage, and the indicated status controls when the voltage regulator 14 may furnish the $V_{CCP}$ voltage to the supply voltage plane 15. More specifically, the power good circuit 16 provides a status signal (called PWR_GOOD) at its output terminal 36. The PWR_GOOD signal, in turn, is received by the voltage regulator 14, and the logical state of the PWR_GOOD signal controls when the voltage regulator 14 provides the $V_{CCP}$ voltage to the supply voltage plane 15.

For example, the power good circuit 16 asserts (drives high, for example) the PWR_GOOD signal to indicate a valid $V_{TT}$ voltage and thus, to cause the voltage regulator 14 to provide the $V_{CCP}$ voltage to the supply voltage plane 15. The power good circuit 16 de-asserts (drives low, for example) the PWR_GOOD signal to indicate an invalid $V_{TT}$ voltage and cause the voltage regulator 14 to tri-state its output terminal and not provide the $V_{CCP}$ voltage to the supply voltage plane 15. As described below, the power good circuit 16 regulates the timing of its assertion of the PWR_GOOD signal to ensure that the processor's indication of its VID number is valid when the voltage regulator 14 generates the $V_{CCP}$ voltage.

In some embodiments of the invention, the power good circuit 16 receives the $V_{TT}$ voltage from a supply voltage plane 19 and compares the $V_{TT}$ voltage to a predefined threshold voltage to determine if the $V_{TT}$ voltage has risen to a level within an acceptable range. In this manner, when system 10 first powers up, the $V_{TT}$ voltage rises from zero volts to a voltage near its nominal level. During the rise of the $V_{TT}$ voltage, the power good circuit 16 de-asserts the PWR_GOOD signal. However, even after the $V_{TT}$ voltage rises to an acceptable level at which the $V_{TT}$ voltage is valid, the power good circuit 16 waits for a predetermined delay interval before asserting the PWR_GOOD signal to ensure that valid voltage identification signals appear on the voltage identification signal lines 17. The power good circuit 16 may use other techniques, in other embodiments of the invention, to determine if the $V_{TT}$ voltage is within a predefined range of acceptable voltages and thus, is valid.

Figure 2:
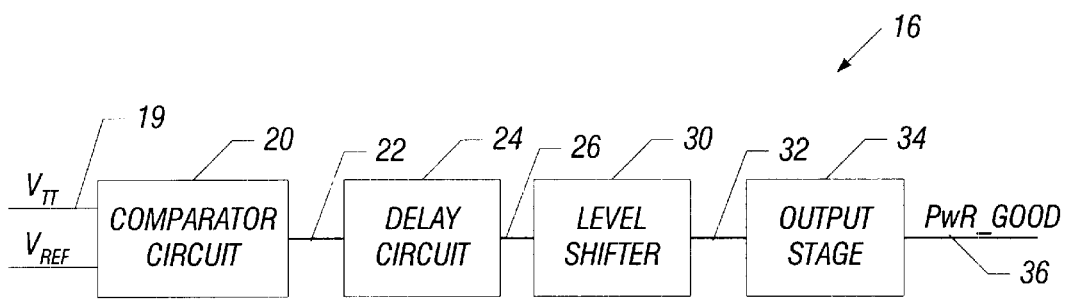
FIG. 2 is a schematic diagram of a power good circuit of the system of FIG. 1 according to an embodiment of the invention.

FIG. 2 depicts components of the power good circuit 16, according to some embodiments of the invention. As shown, the power good circuit 16 may include a comparator circuit 20, a delay circuit 24, a level shifter 30 and an output stage 34. The comparator circuit 20 compares the $V_{TT}$ supply voltage to a predefined voltage level (called $V_{REF}$). When the $V_{CCP}$ voltage is below the $V_{REF}$ voltage, the comparator circuit 20 de-asserts (drives low, for example) its output terminal 22 to place the delay circuit 24 in an initialization state. In the initialization state, the delay circuit 24 de-asserts (drives low, for example) a signal that appears at its output terminal 26 to place the level shifter 30 in a state in which the level shifter 30 de-asserts a voltage that appears at an output terminal 32 of the level shifter 30. The de-assertion of the voltage at the output terminal 32, in turn, causes the output stage 34 to de-assert the PWR_GOOD signal that appears at the output terminal 36 of the output stage 34.

In response to the $V_{TT}$ voltage rising above the $V_{REF}$ voltage, the comparator circuit 20 tri-states its output terminal 22, an event that triggers a response from the delay circuit 24. In this manner, in response to the comparator circuit 20 tri-stating its output terminal 22, the delay circuit 24 leaves the initialization state, and the voltage at the output terminal 26 gradually rises away from its de-asserted level. After a predefined interval of time, the voltage at the output terminal 26 reaches an asserted voltage level to cause the level shifter 30 to enter a state in which the level shifter 30 asserts the voltage at its output terminal 32. The assertion of the voltage at the output terminal 32, in turn, causes the output stage 34 to assert the PWR_GOOD signal.

The inclusion of the level shifter 30 in the power good circuit 16 permits the comparator circuit 20 and the delay circuit 24 to operate at one supply voltage level while allowing the asserted level of the PWR_GOOD signal to be at another supply voltage level. Thus, the same design for the power good circuit 16 may be used, regardless of the particular voltage levels that are used in the system 10.

Figure 3:
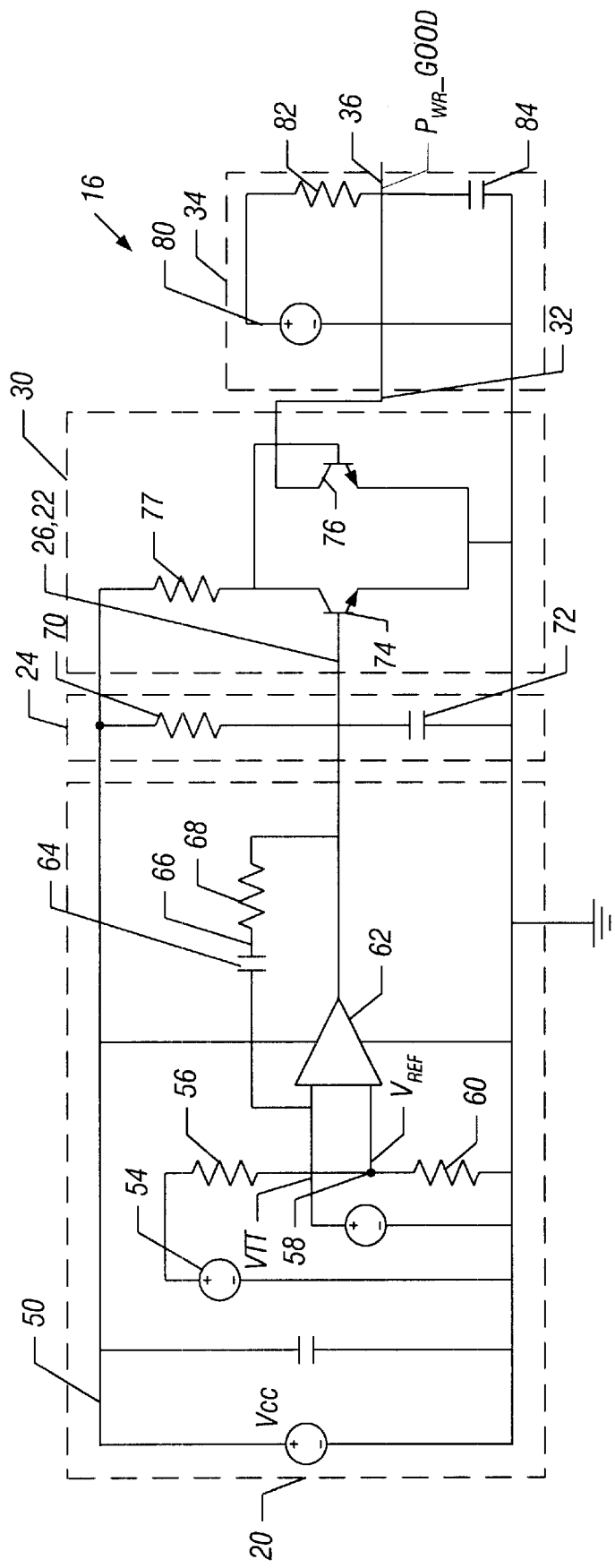
FIG. 3 is a more detailed schematic diagram of the power good circuit according to an embodiment of the invention.

FIG. 3 depicts a more detailed schematic diagram of the power good circuit 16, according to some embodiments of the invention. For the comparator circuit 20, a node 58 of a resistor divider furnishes the $V_{REF}$ voltage. The resistor divider is formed from two resistors 56 and 60. Each resistor 56, 60 has a terminal that is coupled to the node 58. The other terminal of the resistor 56 is coupled to a supply voltage plane 54, and the other terminal of the resistor 60 is coupled to ground.

The node 58 is coupled to the inverting input terminal of a comparator 62 (of the comparator circuit 20) that performs the comparison of the $V_{REF}$ voltage (received at the inverting input terminal of the comparator 62) to the $V_{TT}$ voltage (received at the non-inverting input terminal of the comparator 62). The output terminal of the comparator 62 is coupled to the output terminal 22 of the comparator circuit 20.

In some embodiments of the invention, the comparator 62 has an open drain style output. Therefore, when the $V_{TT}$ voltage is below the $V_{REF}$ voltage, the comparator 62 drives the output terminal 22 low (to ground, for example). When the $V_{TT}$ voltage exceeds the $V_{REF}$ voltage, the comparator 62 tri-states the output terminal 22, as the output terminal of the comparator 62 is part of an open circuit inside the comparator 62.

Among the other features of the comparator circuit 20, the comparator 62, in some embodiments of the invention, may receive its supply voltage from a supply voltage plane 50.

The comparator circuit 20 may also include appropriate frequency compensation for the comparator 62, such as a capacitor 64 and a resistor 66 that are serially coupled together between the non-inverting input terminal of the comparator 62 and the output terminal 22.

In some embodiments of the invention, the delay circuit 24 includes a resistor-capacitor (RC) type delay network that is formed from a resistor 70 that is coupled between the supply voltage plane 50 and the output terminal 22 and a capacitor 72 that is coupled between the output terminal 22 and ground. As shown in FIG. 3, in some embodiments of the invention, the output terminal 26 of the delay circuit 24 may be the same as the output terminal 22 of the comparator circuit 20.

The delay circuit 24 introduces a predefined delay into the rise of the PWR_GOOD signal by controlling the voltage of the output terminal 26 when the comparator 62 tri-states its output terminal. In this manner, when the comparator 62 drives the voltage of its output terminal low, the voltage of the output terminal 26 and the voltage difference across the terminals of the capacitor 72 are driven to near zero volts. This event causes the output stage 34 to de-assert the PWR_GOOD signal, as described above. However, when the comparator 62 tri-states its output terminal, the delay circuit 24 controls the voltage of the output terminal 26. Because the capacitor 72 is effectively discharged when the comparator 62 tri-states its output terminal, the voltage of the output terminal 26 rises upwardly from approximately zero volts to an asserted voltage level in accordance with the time constant that is established by the resistor 70 and the capacitor 72.

Thus, eventually, the voltage on the output terminal 26 rises to a level that causes the assertion of the PWR_GOOD signal. More specifically, the output terminal 26 of the delay circuit 24 is coupled to the base terminal of an NPN bipolar junction transistor (BJT) 74 of the level shifter 30. The collector terminal of the BJT 74 is coupled to one terminal of a resistor 77 (of the level shifter 30), and the other terminal of the resistor 77 is coupled to the supply voltage plane 50. The emitter terminal of the BJT 74 is coupled to ground. The collector terminal of the BJT 74 is also coupled to the base terminal of another NPN BJT 76 of the level shifter 30. The emitter terminal of the BJT 76 is coupled to ground, and the collector terminal of the BJT 76 is coupled to the output terminal 32 of the level shifter 30. As shown in FIG. 3, the output terminals 32 and 36 may be the same, in some embodiments of the invention. For the output stage 34, a resistor 82 may be coupled between a supply voltage plane 80 (that establishes the logic one level for the PWR_GOOD signal) and the output terminal, and a capacitor 84 may be coupled between the output terminal 36 and ground.

Thus, the delay circuit 24 causes the components of the level shifter 30 and output stage 34 to behave in the following manner. When the output terminal 26 of the delay circuit 24 is driven low (when the $V_{TT}$ voltage is below the $V_{REF}$ voltage or during the predefined delay after the $V_{TT}$ voltage surpasses the $V_{REF}$ voltage), the collector-emitter path of the BJT 74 does not conduct, thereby allowing the resistor 77 to pull the base terminal voltage of the BJT 76 to a sufficient level to cause the BJT 76 to conduct. The conduction of the collector-emitter path of the BJT 76 pulls the output terminal 36 (and the PWR_GOOD signal) to ground. When the voltage level of the output terminal 26 reaches the appropriate level to cause the BJT 74 to conduct (after the predefined delay expires), the collector terminal of the BJT 74 pulls the base terminal of the BJT 76 low to cause the collector-emitter path of the BJT 76 to no longer conduct. For this state of the level shifter 30, the resistor 82 pulls the PWR_GOOD signal high to a voltage near the voltage of the supply voltage plane 80.

Figure 4:
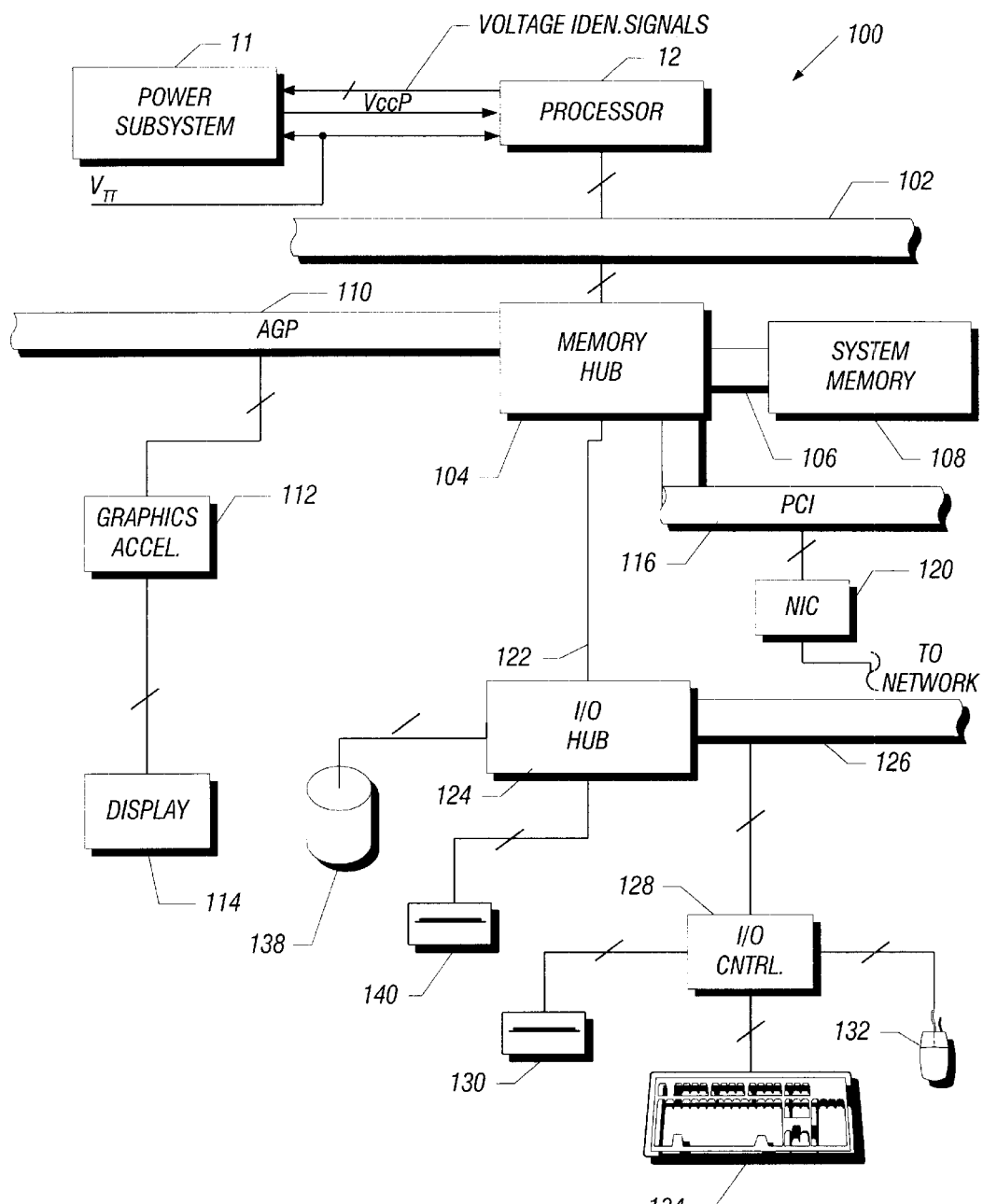
FIG. 4 is a schematic diagram of a computer system according to an embodiment of the invention.

In some embodiments of the invention, the power subsystem 11 may provide power to the processor 12 and other components of a computer system, such as an exemplary computer system 100 that is depicted in FIG. 4. In this context, the term "processor" may refer to, as examples, to at least one microcontroller, X86 microprocessor, Advanced RISC Machine (ARM) microprocessor or Pentium microprocessor. Other types of processors are possible and are within the scope of the following claims.

The processor 12 may be coupled to a local bus 102 along with a north bridge, or memory hub 104. The memory hub 104 may represent a collection of semiconductor devices, or a "chip set," and provide interfaces to a Peripheral Component Interconnect (PCI) bus 116 and an Accelerated Graphics Port (AGP) bus 110. The PCI Specification is available from The PCI Special Interest Group, Portland, OR 97214. The AGP is described in detail in the Accelerated Graphics Port Interface Specification, Revision 1.0, published on Jul. 31, 1996, by Intel Corporation of Santa Clara, Calif.

A graphics accelerator 112 may be coupled to the AGP bus 110 and provide signals to drive a display 114. The PCI bus 116 may be coupled to a network interface card (NIC) 120, for example. The memory hub 104 may also provide an interface to a memory bus 106 that is coupled to a system memory 108.

A south bridge, or input/output (I/O) hub 124, may be coupled to the memory hub 104 via a hub link 122. The I/O hub 124 represents a collection of semiconductor devices, or a chip set, and provides interfaces for a hard disk drive 138, a CD-ROM drive 140 and an I/O expansion bus 126, as just a few examples. An I/O controller 128 may be coupled to the I/O expansion bus 126 to receive input data from a mouse 132 and a keyboard 134. The I/O controller 128 may also control operations of a floppy disk drive 130.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A system comprising:
   a processor to use a first supply voltage to furnish a first indication of a second supply voltage to be received by the processor;
   a voltage regulator to furnish the second supply voltage in response to both the first indication and a second indication that the first supply voltage is valid; and
   a circuit to provide the second indication and regulate a timing of the second indication to prevent the voltage regulator from furnishing the second supply voltage until a predefined interval of time has elapsed after the first supply voltage becomes valid.

2. The system of claim 1, wherein the circuit prevents the voltage regulator from furnishing the second supply voltage until a predefined interval of time has elapsed after the first supply voltage becomes valid.

3. The system of claim 1, wherein the second indication comprises a state of a power good signal.

4. The system of claim 3, wherein the circuit comprises a level shifter to translate a level of the first supply voltage to generate at least one state of the power good signal.

5. The system of claim 1, wherein the circuit comprises:
   a comparator to compare the first supply voltage to a threshold level to detect when the first supply voltage is valid.

6. The system of claim 1, wherein the circuit comprises:
   a resistor; and
   a capacitor coupled to the resistor to introduce the predefined interval of time.

7. The system of claim 1, wherein the first indication represents a voltage identification number.

8. An apparatus comprising:
   a first circuit to indicate whether a supply voltage is valid; and
   a second circuit to receive the indication from the first circuit, measure a delay interval from the time when the first circuit indicates the supply voltage is valid and provide a status signal that indicates the supply voltage is valid in response to the expiration of the delay interval.

9. The apparatus of claim 8, wherein the first circuit comprises:
   a comparator to compare the supply voltage to a predefined threshold to determine whether the supply voltage is valid.

10. The apparatus of claim 8, wherein the signal comprises a power good signal.

11. The apparatus of claim 8, wherein the second circuit comprises:
    a level shifter to translate a level of the first supply voltage to produce the signal.

12. The apparatus of claim 8, wherein the circuit comprises:
    a resistor; and
    a capacitor coupled to the resistor to introduce the delay interval.

13. A method comprising:
    in response to receiving a first supply voltage, providing an indication of a second supply voltage to be received by a processor;
    furnishing the second supply voltage in response to the indication; and
    preventing the furnishing until a predefined interval of time has elapsed after the first supply voltage becomes valid.

14. The method of claim 13, further comprising:
    comparing the first supply voltage to a predefined threshold to determine if the first supply voltage is valid.

15. The method of claim 13, wherein the preventing comprises:
    providing a time-delayed power good signal based on whether the first supply voltage is valid.

16. The method of claim 15, wherein the preventing further comprises:
    level shifting the first supply voltage to generate the power good signal.

17. The method of claim 13, wherein the indication comprises a processor voltage identification number.

18. A method comprising:
    detecting whether a supply voltage is valid;
    measuring a delay interval in response to the supply voltage becoming valid;

generating a signal to indicate that the supply voltage is valid in response to the expiration of the delay interval; and generating another supply voltage in response to the indication that the first supply voltage is valid.

19. The method of claim 18, further comprising:

comparing the supply voltage to a predefined threshold to determine if the supply voltage is valid.

20. The method of claim 18, wherein the signal comprises a power good signal.

21. The method of claim 18, wherein the generating comprises:

level shifting the supply voltage to generate the signal.

22. The method of claim 18, further comprising:

introducing the delay interval to prevent a voltage regulator from prematurely responding to a processor voltage identification signal.

* * * * *